US012675736B2

(12) United States Patent
Matsumoto

(10) Patent No.: US 12,675,736 B2
(45) Date of Patent: Jul. 7, 2026

(54) MACHINE LEARNING METHOD FOR PREDICTING A SENSORY RESULT

(71) Applicant: SHIMADZU CORPORATION, Kyoto (JP)

(72) Inventor: Keiko Matsumoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 706 days.

(21) Appl. No.: 18/103,759

(22) Filed: Jan. 31, 2023

(65) Prior Publication Data

US 2023/0252350 A1      Aug. 10, 2023

(30) Foreign Application Priority Data

Feb. 7, 2022      (JP) ................................. 2022-016880

(51) Int. Cl.
*G06N 20/00*              (2019.01)
(52) U.S. Cl.
CPC ................................... *G06N 20/00* (2019.01)
(58) Field of Classification Search
CPC ........... G06N 20/00; G06N 3/02; G06Q 50/10
See application file for complete search history.

(56) References Cited

U.S. PATENT DOCUMENTS

| | | |
|---|---|---|
| 2002/0099573 A1 | 7/2002 | Koguchi et al. |
| 2015/0046471 A1 | 2/2015 | Tompkins |
| 2020/0202038 A1 | 6/2020 | Zhang et al. |
| 2020/0301987 A1 | 9/2020 | Kamen et al. |

| | | | |
|---|---|---|---|
| 2020/0349920 A1* | 11/2020 | Al Bawab | ................ G06N 3/09 |
| 2021/0019667 A1 | 1/2021 | Hudson et al. | |
| 2021/0124986 A1 | 4/2021 | Imine | |

(Continued)

FOREIGN PATENT DOCUMENTS

| | | |
|---|---|---|
| CN | 110915165 A | 3/2020 |
| JP | H09218192 A | 8/1997 |
| JP | 2004-318556 A | 11/2004 |

(Continued)

OTHER PUBLICATIONS

Kappes, S.M., Schmidt, S.J. and Lee, S.-Y. (2007), Relationship between Physical Properties and Sensory Attributes of Carbonated Beverages. Journal of Food Science, 72: S001-S011. (Year: 2006).*

(Continued)

*Primary Examiner* — Kamran Afshar
*Assistant Examiner* — Gwynevere A Deterding
(74) *Attorney, Agent, or Firm* — Renner, Otto, Boisselle & Sklar, LLP

(57) ABSTRACT

A second device performs receiving an analysis result of analyzing a food sample by an analysis instrument, examining the analysis result to obtain an examination result, acquiring first information regarding whether the analysis result is made public or private and second information regarding whether the examination result is made public or private, storing the first information and the analysis result in association with each other and storing the second information and the examination result in association with each other, and performing machine learning for predicting an examination result using, as training data, at least either the analysis result or the examination result, the analysis result or the examination result being set public.

12 Claims, 8 Drawing Sheets

(56) References Cited

U.S. PATENT DOCUMENTS

| | | | | |
|---|---|---|---|---|
| 2022/0138603 A1 * | 5/2022 | Tarumi | .................. | G06N 5/041 |
| | | | | 706/46 |

FOREIGN PATENT DOCUMENTS

| | | | | | | |
|---|---|---|---|---|---|---|
| JP | 2008-117365 | A | | 5/2008 | | |
| JP | 2009-300168 | A | | 12/2009 | | |
| JP | 2012-155407 | A | | 8/2012 | | |
| JP | 2018018354 | A | * | 2/2018 | | |
| JP | 2020-123174 | A | | 8/2020 | | |
| JP | 2020-184167 | A | | 11/2020 | | |
| JP | 2021-072490 | A | | 5/2021 | | |
| JP | 2021162490 | A | | 10/2021 | | |
| KR | 20150083154 | A | * | 7/2015 | ............ | G06Q 50/12 |
| WO | 2021079925 | A1 | | 4/2021 | | |

OTHER PUBLICATIONS

Chen et al., "Estimation of Beer Sensory Evaluation Based on Principal Component Analysis and Neural Network", Food and Fermentation Industries, vol. 39, No. 3, 2013, 13 pages (9 pages of English Translation and 4 pages of Official Copy).

Office Action received for Chinese Patent Application No. 202310121275.X, mailed on Aug. 7, 2025, 13 pages (6 pages of English Translation and 7 pages of Official Copy).

Office Action received for Japanese Patent Application No. 2022-016880, mailed on Aug. 5, 2025, 4 pages (2 pages of English Translation and 2 pages of Official Copy).

Aurélien Géron, "Hands-on Machine Learning with Scikit-Learn, Keras, and TensorFlow, 2nd Edition", China Machine Press, Oct. 31, 2020, p. 589.

Second Office Action received for Chinese Patent Application No. 202310121275.X, mailed on Apr. 2, 2026, 14 pages.

* cited by examiner

[LEARNING PHASE]

[OPERATION PHASE]
1000

FIG.7

| TYPE | SENSORY RESULT | | | | | ANALYSIS RESULT | | | | | | | | | | | | |
|---|---|---|---|---|---|---|---|---|---|---|---|---|---|---|---|---|---|---|
| | STRENGTH OF AROMA | STRENGTH OF TASTE | SWEET OR DRY TASTE | RIPENESS | ALCOHOL CONTENT | SAKE METER VALUE | ACIDITY | AMINO ACIDITY | ISOAMYL ACETATE | ISOAMYL ALCOHOL | ETHYL CAPROATE | CITRIC ACID | PYRUVIC ACID | MALIC ACID | SUCCINIC ACID | LACTIC ACID | ACETIC ACID | GLUCOSE |
| AVERAGE SAKE A | 1.81 | 2.19 | 2.67 | 2 | 14 | 3 | 1 | 1.1 | 6 | 59 | 7.3 | 155 | 0 | 0 | 167 | 336 | 11 | 2.2 |
| JUNMAI GINJO A | 2.43 | 2.71 | 2.89 | 2.33 | 17 | -5 | 1.8 | 1.3 | 2.4 | 186 | 1.2 | 279 | 0 | 390 | 404 | 423 | 0 | 2.9 |
| JUNMAI SAKE A | 2.95 | 2.52 | 2.89 | 2.44 | 13 | -1 | 1.9 | 0.9 | 2.3 | 100 | 0.6 | 204 | 93 | 226 | 307 | 458 | 0 | 2.8 |
| SPECIAL JUNMAI A | 2.24 | 2.7 | 2.44 | 2.11 | 16.2 | 1 | 1.4 | 1.3 | 2.5 | 138 | 3.4 | 269 | 63 | 261 | 303 | 335 | 0 | 1.2 |
| JUNMAI SAKE B | 2.9 | 2.9 | 2.67 | 2.89 | 15 | 0 | 1.3 | 1.9 | 1.3 | 155 | 1 | 257 | 52 | 297 | 373 | 392 | 6 | 2.1 |
| JUNMAI GINJO B | 1.9 | 0.24 | 2.33 | 1.78 | 16.4 | 2.4 | 1.4 | 1.1 | 2 | 142 | 3.6 | 218 | 43 | 273 | 318 | 309 | 0 | 1.3 |
| JUNMAI GINJO C | 1.76 | 3.1 | 2.78 | 2.11 | 16.7 | 2 | 1.5 | 1 | 1.9 | 132 | 4.2 | 223 | 149 | 317 | 312 | 297 | 0 | 1.9 |
| JUNMAI SAKE C | 2.86 | 1.9 | 1.44 | 2.11 | 15 | 10 | 1.6 | 1.2 | 2.5 | 127 | 2.1 | 223 | 64 | 190 | 344 | 332 | 11 | 1 |
| JUNMAI GINJO D | 2.14 | 3.43 | 3.78 | 2.78 | 16 | -8 | 1.5 | 1.1 | 2.1 | 142 | 3.4 | 222 | 114 | 319 | 339 | 374 | 9 | 4.2 |

FIG.8

| CLIENT INFORMATION | NUMBER OF PUBLIC ANALYSIS RESULTS (14 IN TOTAL) | NUMBER OF PUBLIC EXAMINATION RESULTS (4 IN TOTAL) | AMOUNT INFORMATION (DISCOUNT RATE) |
|---|---|---|---|
| CLIENT A | 14 | 4 | 15% |
| CLIENT B | 10 | 3 | 7% |
| CLIENT C | 8 | 2 | 5% |
| CLIENT D | 5 | 1 | 3% |
| CLIENT E | 0 | 0 | 0% |
| ... | ... | ... | ... |

MACHINE LEARNING METHOD FOR PREDICTING A SENSORY RESULT

BACKGROUND OF THE INVENTION

Field of the Invention

The present disclosure relates to a machine learning method.

Description of the Background Art

As disclosed in Japanese Patent Laying-Open No. 2020-184167, a system that narrows down search results by inputting a plurality of search conditions is known as a sake brewing analysis system.

SUMMARY OF THE INVENTION

Although a sensory measurement result (hereinafter, referred to as a sensory result) is typically used in each organization only, the larger the number of sensory results, the more the accuracy and efficiency of research and development is improved, so that there is a demand for using sensory results outside the organization. The attitude to whether sensory results are made public greatly differs among private companies and research institutions. The system disclosed in Japanese Patent Laying-Open No. 2020-184167 does not take whether information including sensory results of sake as a food sample is made public or private in one company or organization into consideration.

Further, in research and development in the food field, a company or a research institution manages sensory results of food samples within each organization and has no system that manages the sensory results as public information.

The present disclosure has been made to solve such problems, and it is therefore an object of the present disclosure to provide a machine learning method that takes whether a sensory result is made public or private into consideration.

The present disclosure relates to a machine learning method that is performed by a computing device belonging to a system management company. The computing device performs acquiring an analysis result of analyzing a sample by an analysis instrument and a first sensory result of the sample, acquiring public setting information regarding whether the analysis result and the first sensory result are made public or private, storing the public setting information, and the analysis result and the first sensory result with the public setting information associated with the analysis result and the first sensory result, creating a learned model by performing machine learning for predicting the first sensory result using, as training data, at least either the analysis result or the first sensory result, the analysis result or the first sensory result being set public, and outputting a second sensory result by inputting the analysis result that is set private to the learned model created by performing the machine learning.

According to the present disclosure, it is possible to provide the machine learning method that takes whether a sensory result is made public or private into consideration.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing sensory results and analysis results of food samples.

FIG. 8 is a diagram showing the number of public analysis results, the number of public examination results, and amount information based on client information.

DESCRIPTION OF THE PREFERRED EMBODIMENTS

Figure 1:
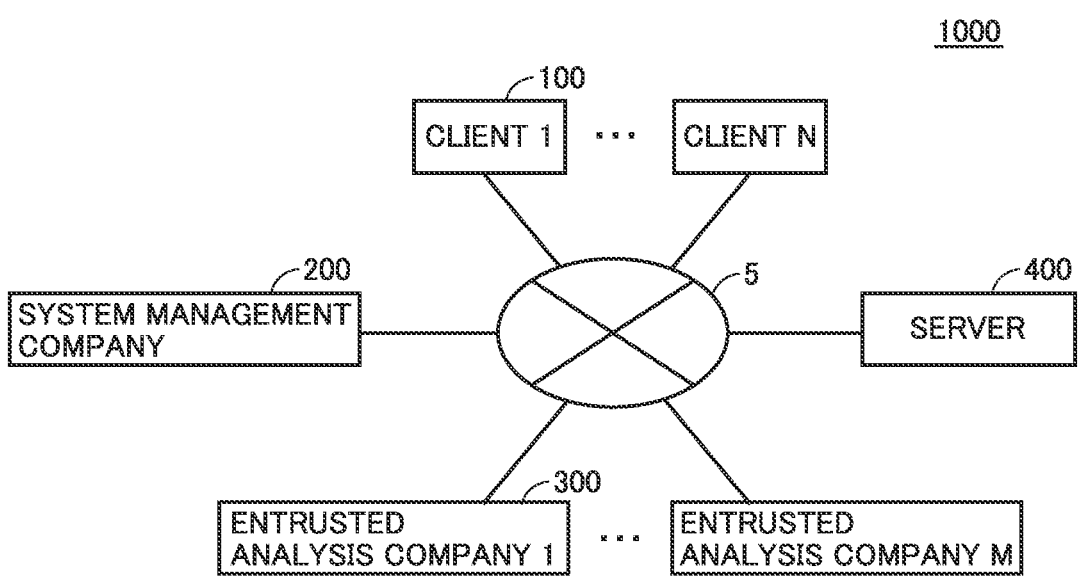
FIG. 1 is a diagram schematically illustrating an overall configuration of an analysis system according to a first embodiment.

The present embodiment will be described in detail with reference to the drawings. Note that the same or corresponding parts in the drawings are denoted by the same reference numerals, and no redundant description will be given of such parts in principle.

First Embodiment

Figure 2:
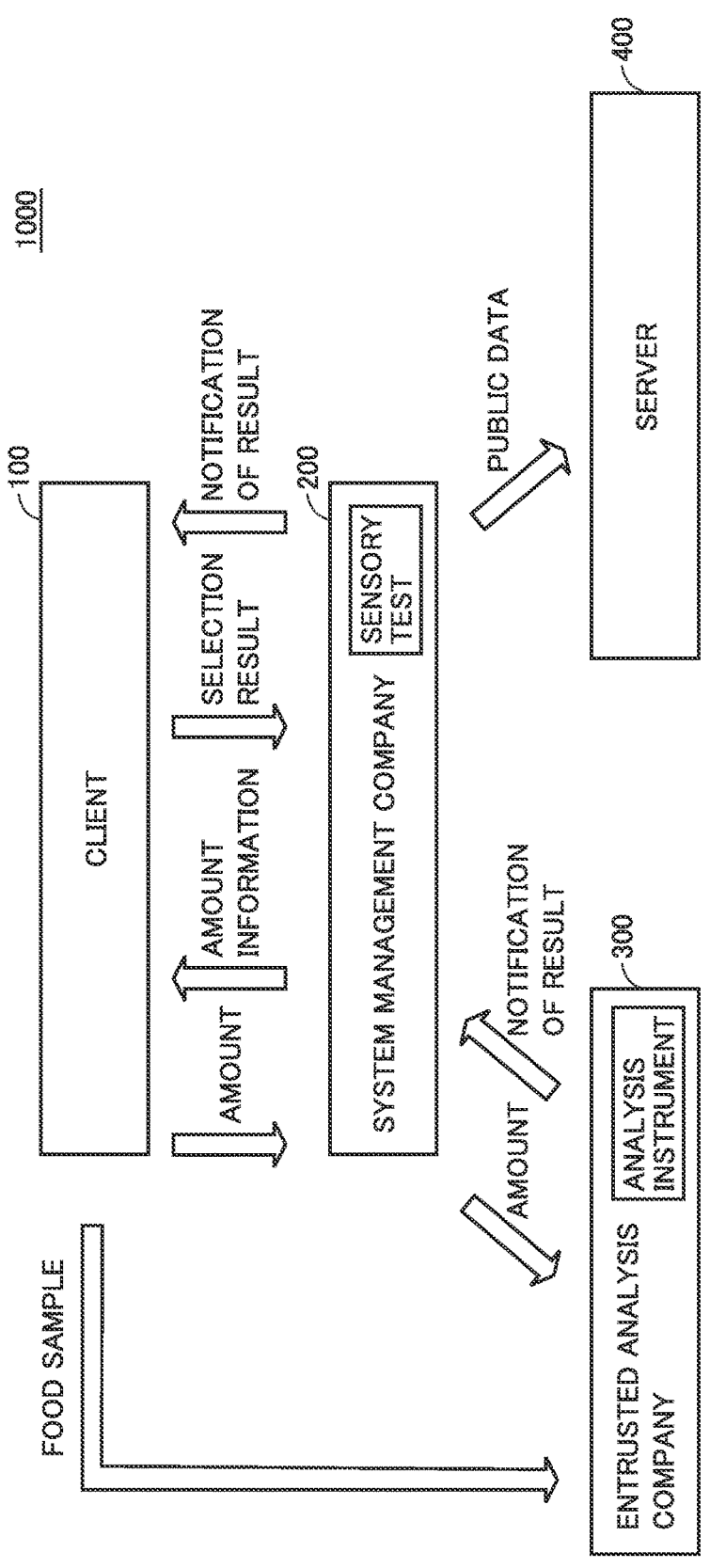
FIG. 2 is a diagram for describing a flow of the analysis system according to the first embodiment.
Figure 3:
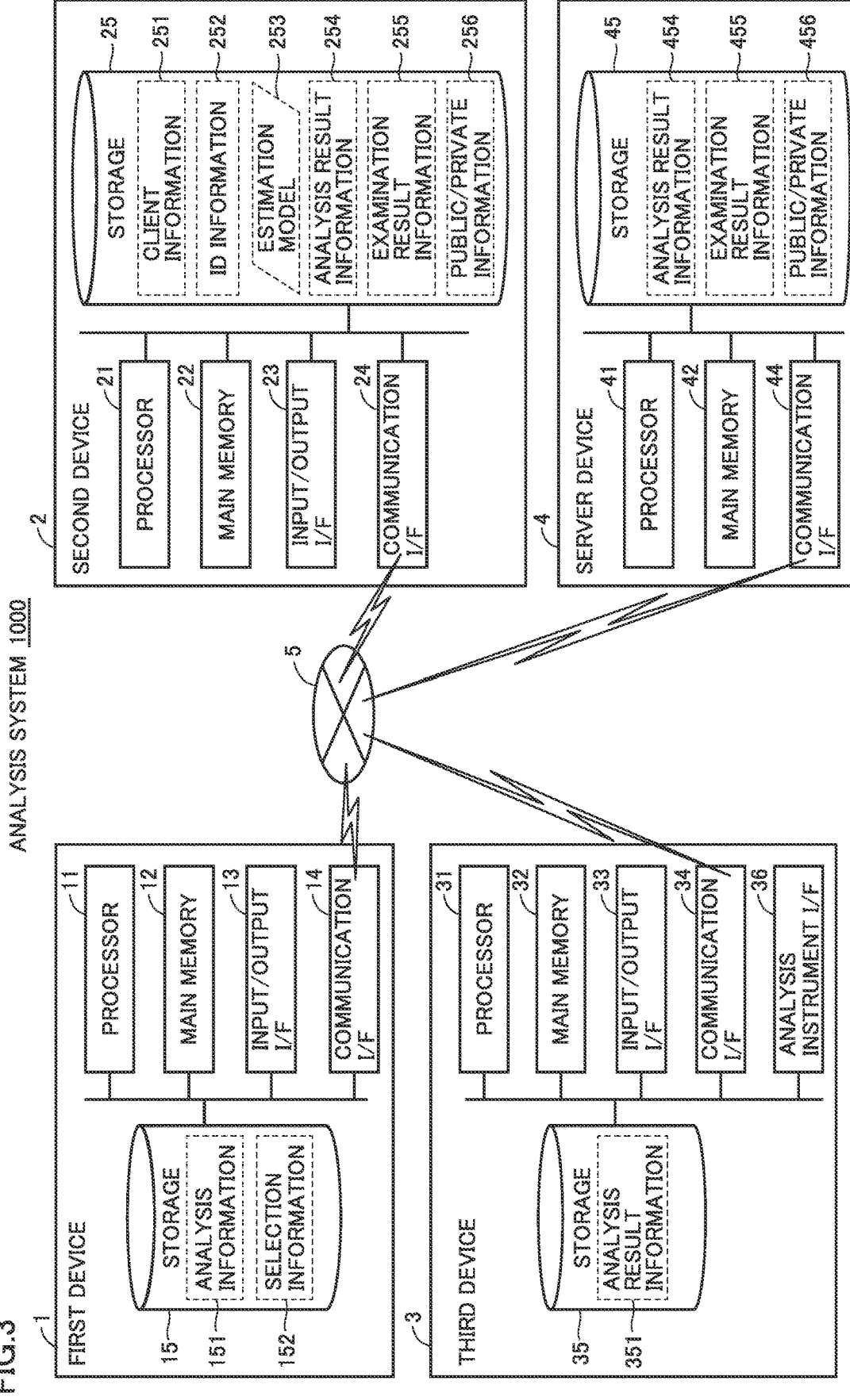
FIG. 3 is a diagram illustrating a configuration of each device of the analysis system according to the first embodiment.
Figure 4:
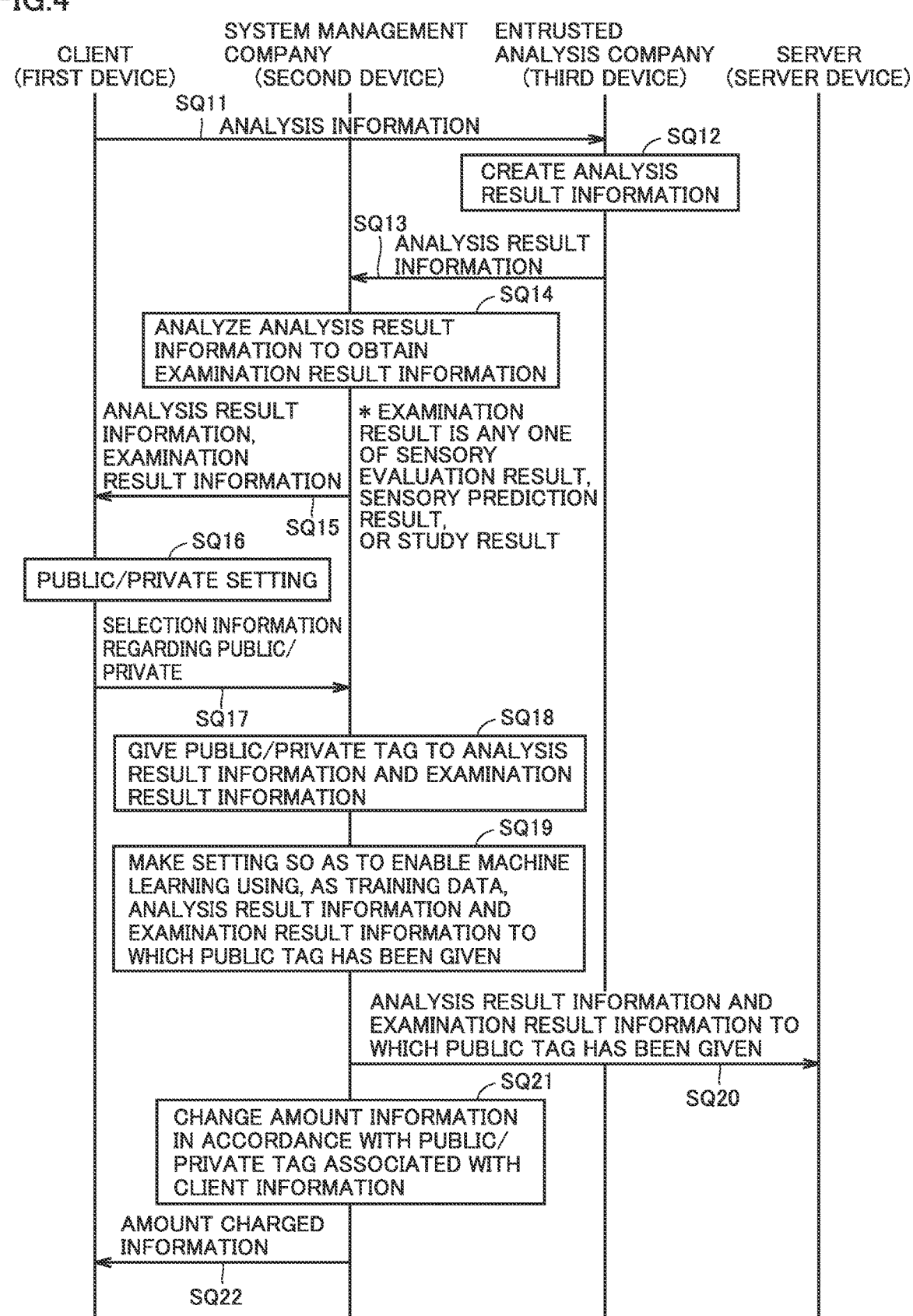
FIG. 4 is a sequence diagram of the analysis system according to the first embodiment.

A machine learning method applied to an analysis system 1000 according to a first embodiment will be described with reference to FIG. 1 to 4. FIG. 1 is a diagram schematically illustrating an overall configuration of analysis system 1000 according to the first embodiment. FIG. 2 is a diagram for describing a flow of analysis system 1000 according to the first embodiment. FIG. 3 is a diagram illustrating a configuration of each device of analysis system 1000 according to the first embodiment. FIG. 4 is a sequence diagram of analysis system 1000 according to the first embodiment.

As illustrated in FIG. 1, in analysis system 1000, devices belonging to a client 100, a system management company 200, an entrusted analysis company 300, and a server 400 are connected over a network 5. Client 100 is in a position to request analysis of a food sample and is provided as clients 1 to N, for example. System management company 200 is in a position to manage entire analysis system 1000, and only one system management company 200 is provided, for example. Entrusted analysis company 300 is in a position to analyze a food sample and is provided as entrusted analysis companies 1 to M, for example. There may be only one entrusted analysis company 300. Server 400 is in a position to store various data and make the various data public, and only one server 400 is provided, for example. There may be a plurality of servers 400.

With reference to FIG. 2, a flow of analysis system 1000 between a set of client 100, system management company 200, entrusted analysis company 300, and server 400 will be described. Client 100 sends a food sample to entrusted analysis company 300. Entrusted analysis company 300 analyzes the food sample using an analysis instrument. Entrusted analysis company 300 notifies system management company 200 of an analysis result.

System management company 200 pays an amount for the analysis request to entrusted analysis company 300. System management company 200 causes a sensory measurement evaluator who belongs to system management company 200 to perform a sensory test on the food sample. The sensory test refers to a test for determining the quality of a product using human senses (visual sense, auditory sense, gustatory sense, olfactory sense, somatosensory sense, and the like) and is applied to foods, flavors, industrial products, and the like. The sensory test gives a sensory result.

System management company 200 acquires the analysis result. System management company 200 examines the acquired analysis result to obtain an examination result that is a first sensory result or a second sensory result. The examination result refers to, for example, a study result created based on the analysis result and the sensory result. System management company 200 notifies client 100 of the analysis result and the examination result.

Client 100 sets whether the analysis result is made public or private, sets whether the examination result is made public or private, and notifies system management company 200 of the selection result. System management company 200 transmits amount information to client 100. Client 100 pays the amount to system management company 200 based on the amount information. System management company 200 transmits, to server 400, public data that is made public based on the selection result.

With reference to FIG. 3, configurations of various devices used in analysis system 1000 will be described. In analysis system 1000, a first device 1 belonging to client 100, a second device 2 belonging to system management company 200, a third device 3 belonging to entrusted analysis company 300, and a server device 4 belonging to server 400 are connected over network 5.

First device 1, second device 2, and third device 3 are each constructed in accordance with a general-purpose computer architecture. In the present embodiment, first device 1, second device 2, and third device 3 are each a desktop computer. First device 1, second device 2, and third device 3 may be each a device other than a desktop computer such as a laptop computer, a tablet computer, or a mobile terminal such as a smartphone.

Server device 4 is constructed in accordance with a general-purpose computer architecture. In the present embodiment, server device 4 belongs to system management company 200.

First device 1 includes a processor 11, a main memory 12, an input/output interface 13, a communication interface 14, and a storage 15. Such components are connected over a bus.

Processor 11 is a processing entity (computer) that performs various processing in accordance with various programs. Processor 11 includes, for example, at least one of a central processing unit (CPU), a field programmable gate array (FPGA), a graphics processing unit (GPU), or a multi processing unit (MPU). Note that processor 11 may be constructed of processing circuitry. Processor 11 performs, for example, processing of reading a program stored in storage 15, loading the program into main memory 12, and running the program.

Main memory 12 includes a volatile storage device such as a random access memory (RAM), a dynamic RAM (DRAM), or a static random access memory (SRAM), and a non-volatile storage device such as a read only memory (ROM).

Input/output interface 13 transfers, to each device, a signal input by a user using, for example, a button or a touchscreen, and a signal output to a display device such as a liquid crystal display.

Communication interface 14 transmits and receives data (information) to and from another device via wired connection or wireless connection. In the present embodiment, communication interface 14 transmits and receives data (information) to and from another communication interface using wireless communication over network 5.

Storage 15 includes a non-volatile storage device such as a hard disk drive (HDD) or a solid state drive (SSD). Storage 15 stores analysis information 151 including a sensory evaluation item of a sensory test on a food sample and an analysis evaluation item corresponding to the sensory evaluation item, selection information 152 indicating a result of selecting public data and private data, and the like.

Second device 2 includes a processor 21, a main memory 22, an input/output interface 23, a communication interface 24, and a storage 25. Such components are connected over a bus.

Processor 21, main memory 22, input/output interface 23, communication interface 24, and storage 25 in second device 2 are the same in configuration as processor 11, main memory 12, input/output interface 13, communication interface 14, and storage 15 in first device 1, respectively.

Storage 25 stores client information 251, ID information 252, an estimation model 253, analysis result information 254, examination result information 255, public/private information 256, and the like.

Client information 251 is information regarding client 100. ID information 252 is information for identifying a client associated with client information 251. Estimation model 253 is a model used in machine learning, and details of estimation model 253 will be described later. Analysis result information 254 is information regarding an analysis result of a food sample. Examination result information 255 is information as the first sensory result or the second sensory result created based on analysis result information 254 and a sensory result. Public/private information 256 is information indicating whether analysis result information 254 and examination result information 255 are set public or private.

Third device 3 includes a processor 31, a main memory 32, an input/output interface 33, a communication interface 34, a storage 35, and an analysis instrument interface 36. Such components are connected over a bus.

Processor 31, main memory 32, input/output interface 33, communication interface 34, and storage 35 in third device 3 are the same in configuration as processor 11, main memory 12, input/output interface 13, communication interface 14, and storage 15 in first device 1, respectively.

Analysis instrument interface 36 inputs and outputs information to and from the analysis instrument that belongs entrusted analysis company 300 and analyzes a food sample. Storage 35 stores, for example, analysis result information 351 regarding an analysis result of a food sample.

Server device 4 includes a processor 41, a main memory 42, a communication interface 44, and a storage 45. Such components are connected over a bus.

Processor 41, main memory 42, communication interface 44, and storage 45 in server device 4 are the same in configuration as processor 11, main memory 12, communication interface 14, and storage 15 in first device 1, respectively.

Storage 45 stores analysis result information 454, examination result information 455, public/private information

456, and the like corresponding to analysis result information 254, examination result information 255, and public/private information 256 transmitted from second device 2.

A processing flow among first device 1 of client 100, second device 2 of system management company 200, third device 3 of entrusted analysis company 300, and server device 4 of server 400 will be described with reference to FIG. 4. "SQ" in FIG. 4 means a sequence.

In SQ11, first device 1 transmits analysis information to third device 3. In SQ12, third device 3 analyzes a food sample using the analysis instrument based on analysis item information included in the analysis information thus received. Subsequently, in SQ12, third device 3 creates analysis result information. In SQ13, third device 3 transmits the analysis result information to second device 2.

In SQ14, second device 2 registers the analysis result information thus received and analyzes the analysis result information to obtain examination result information as the first sensory result. The examination result information includes any one of sensory result information created based on a result of a sensory test obtained from a sensory measurement evaluator, sensory result prediction information obtained through machine learning using estimation model 253, or study result information obtained from the analysis result information and the sensory result information (or sensory prediction result information).

In SQ15, second device 2 transmits the analysis result information and the examination result information to first device 1. Note that the analysis result information and the examination result information are associated with an ID for identifying the client. In SQ16, first device 1 sets whether the analysis result information and the examination result information thus received are made public or private.

In SQ17, first device 1 transmits, to second device 2, selection information indicating a result of selecting whether the analysis result information and the examination result information are made public or private. In SQ18, second device 2 gives a public tag or a private tag to each item of the analysis result information and each item of the examination result information. In SQ19, second device 2 makes a setting so as to enable machine learning for predicting analysis result information using, as training data, analysis result information and examination result information to which the public tag has been given. Specifically, machine learning is performed to create a learned model. Then, when the analysis result set public or private is input to the learned model, the examination result information as the second sensory result can be obtained.

In SQ20, second device 2 transmits, to server device 4, the analysis result information and the examination result information to which the public tag has been given. In SQ21, second device 2 performs a calculation to change the information regarding the amount charged to client 100 in accordance with the public tag and the private tag associated with the client information. In-SQ24 SQ22, second device 2 transmits, to first device 1, the information regarding the amount charged based on the value calculated in SQ21. The amount charged includes, for example, a usage fee of the machine learning method, a fixed fee charged as a subscription, an examination fee for acquiring the examination result information, and the like.

Figure 5:
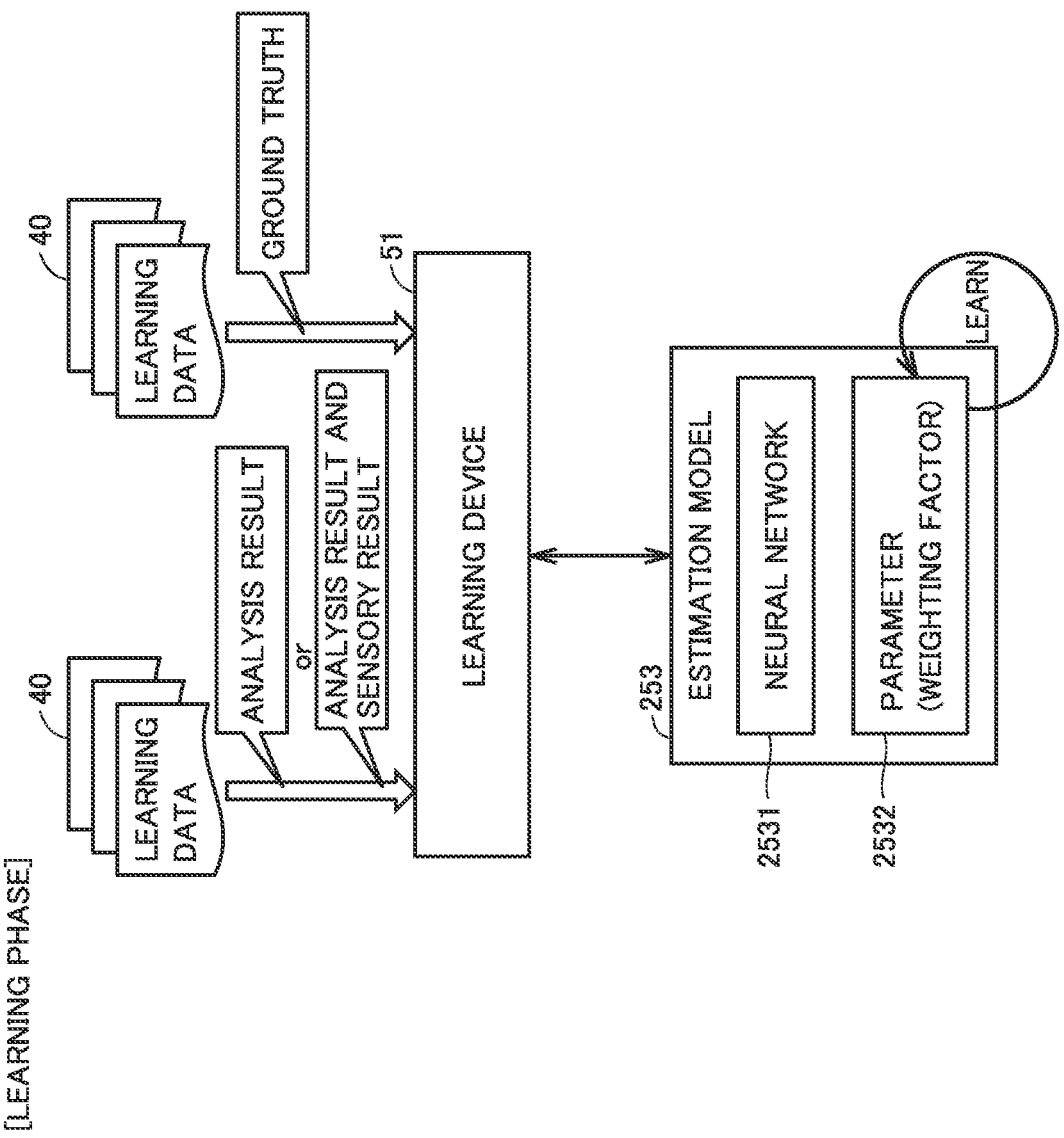
FIG. 5 is a diagram for describing how an estimation model learns in a learning phase.
Figure 6:
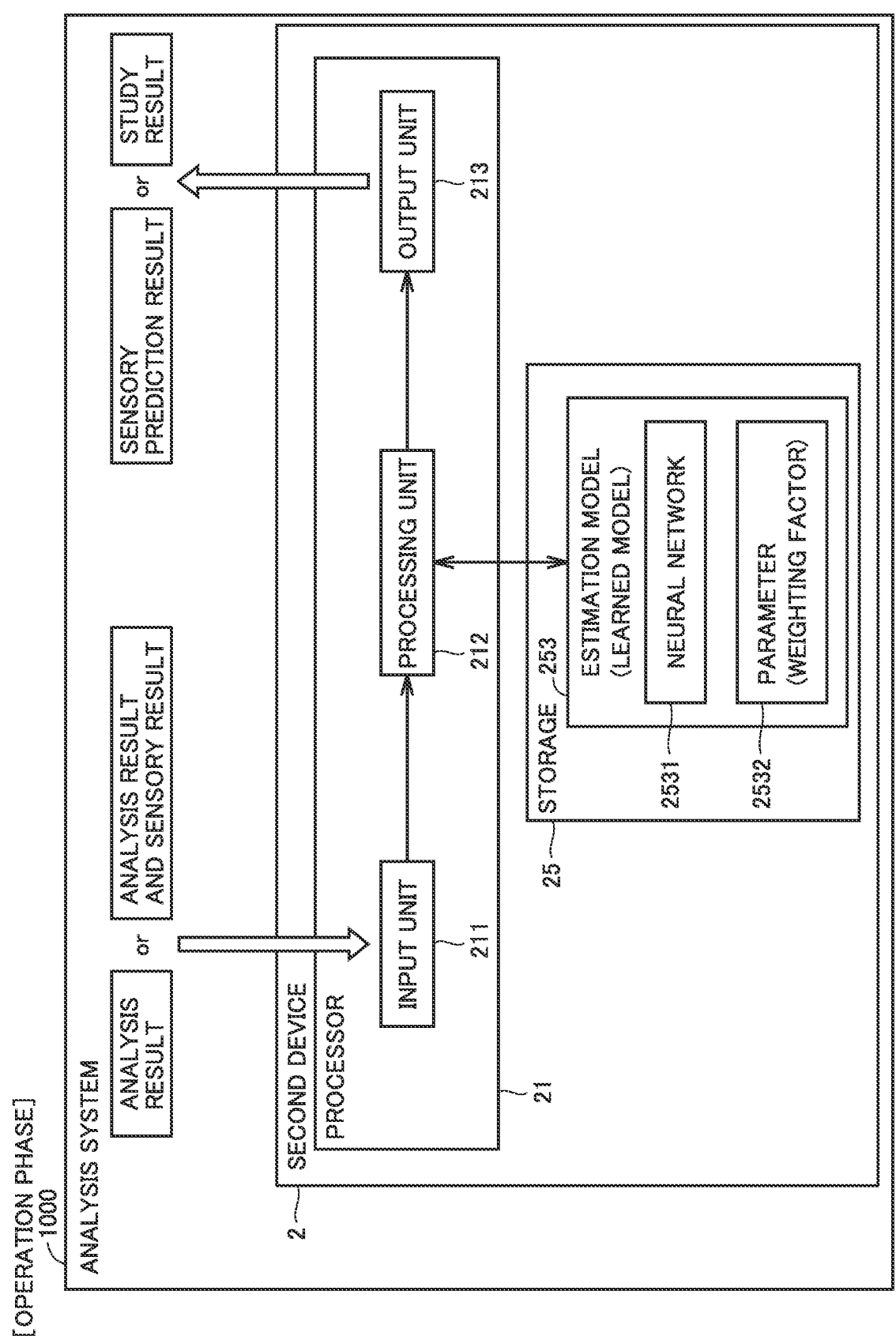
FIG. 6 is a diagram illustrating a configuration of the analysis system in an operation phase.

The learning phase and the operation phase of estimation model 253 of the present embodiment will be described with reference to FIGS. 5 and 6. FIG. 5 is a diagram for describing how the estimation model learns in the learning phase. FIG. 6 is a diagram illustrating a configuration of the analysis system in an operation phase.

As illustrated in FIG. 5, the learning phase is a preliminary learning phase in which estimation model 253 learns before the analysis result or the analysis result and the sensory result are provided to second device 2. Learning device 51 causes estimation model 253 to learn to estimate a sensory result as the second sensory result from the analysis result or predict a study result as the second sensory result from the analysis result and the sensory result.

As a learning algorithm for causing estimation model 253 to learn, known algorithms such as supervised learning, unsupervised learning, and reinforcement learning can be used. In the present embodiment, learning device 51 causes estimation model 253 to learn based on supervised learning using learning data 40.

Learning data 40 is prepared in advance for learning of estimation model 253 and includes an analysis result and a sensory result corresponding to the analysis result. For example, a program designer associates a plurality of past analysis results of a food sample with a sensory result (ground truth) corresponding to the analysis results to obtain learning data (training data) 40. The designer prepares a plurality of pieces of such learning data 40 in advance.

Estimation model 253 includes a neural network 2531 and a parameter 2532 used by neural network 2531. As neural network 2531, a known neural network used in processing based on deep learning such as a convolution neural network (CNN), a recurrent neural network (RNN), or a long short term memory (LSTM) network is applied.

Estimation model 253 performs deep learning using neural network 2531 as described above. Parameter 2532 includes a weighting factor used for calculation in neural network 2531. Note that estimation model 253 is not limited to a model that is caused to learn by deep learning using a neural network, and may be a model that is caused to learn by other machine learning. Here, estimation model 253 before learning and learned estimation model 253 are collectively referred to as an "estimation model", but learned estimation model 253 is also referred to as a "learned model".

Learning device 51 receives input of an analysis result or input of an analysis result and a sensory result from learning data 40. Learning device 51 performs processing of estimating a sensory result or a study result based on the analysis result or the analysis result and the sensory result thus input, and estimation model 253 including neural network 2531.

Learning device 51 causes estimation model 253 to learn based on the estimation result of the sensory result and the ground truth (the sensory result corresponding to the analysis result) included in learning data 40. Specifically, learning device 51 causes estimation model 253 to learn to create a learned model by adjusting parameter 2532 (for example, a weighting factor) so as to make the estimation result of the sensory result obtained by estimation model 253 as close as possible to the ground truth.

Alternatively, learning device 51 causes estimation model 253 to learn based on the estimation result of the study result and the ground truth (the study result corresponding to the analysis result and the sensory result) included in learning data 40. Specifically, learning device 51 causes estimation model 253 to learn to create a learned model by adjusting parameter 2532 (for example, a weighting factor) so as to make the estimation result of the study result obtained by estimation model 253 as close as possible to the ground truth.

The operation phase illustrated in FIG. 6 is a phase in which the sensory prediction result or the study result is estimated as the second sensory result using estimation model 253 that is a learned model after providing the analysis result or the analysis result and the examination result. As illustrated in FIG. 6, second device 2 stores estimation model 253 learned by learning device 51 illustrated in FIG. 5 in storage 25. For example, second device 2 acquires estimation model 253 from learning device 51 and stores estimation model 253 thus acquired in storage 25. Note that learning device 51 may be second device 2, and the above-described function of learning device 51 may be a function processor 21 of second device 2 has.

Processor 21 of second device 2 includes an input unit 211, a processing unit 212, and an output unit 213. Input unit 211 receives input of the analysis result, or input of the analysis result and the examination result. Processing unit 212 performs processing of estimating the sensory prediction result or the study result based on the analysis result or the analysis result and the examination result input from input unit 211 and estimation model 253 including neural network 2531. Note that, as described above, estimation model 253 is not limited to a model that is caused to learn by deep learning using a neural network, and may be a model that is caused to learn by other machine learning. Output unit 213 outputs the result obtained by processing unit 212 as the sensory prediction result or the study result.

FIG. 7 is a diagram showing sensory results and analysis results of food samples. FIG. 7 shows specific examples of sensory results and analysis results in a case where a plurality of types of sake are used as food samples. For sake, for example, a sensory measurement evaluator performs a sensory test to quantify sensory evaluation items including "strength of aroma", "strength of taste", "sweet or dry taste", and "ripeness". As analysis items corresponding to the sensory evaluation items, "alcohol content", "sake meter value", "acidity", "amino acidity", "isoamyl acetate", "isoamyl alcohol", "ethyl caproate", "citric acid", "pyruvic acid", "malic acid", "succinic acid", "lactic acid", "acetic acid", and "glucose" are analyzed by the analysis instrument and quantified.

More specifically, for example, the amounts of analysis items of "ethyl caproate" and "glucose" affect the sensory evaluation item of "strength of aroma". When such amounts are large, "strength of aroma" can be determined to be large.

Second device 2 creates, based on the analysis result and the sensory result illustrated in FIG. 7, a study result indicating a relation between the analysis result and the sensory result. The study result is, for example, data indicating that a certain peak value in a chromatogram of the analysis result corresponds to a certain sensory evaluation taste item.

FIG. 8 is a diagram showing the number of public analysis results, the number of public examination results, and amount information based on the client information. Client 100 sets whether each item of the acquired analysis result is made public or private, and sets whether each item of the acquired examination result is made public or private. Information regarding whether the analysis result and the examination result are made public or private is also referred to as public setting information. The public setting information includes first information regarding whether the analysis result is made public or private and second information regarding whether the examination result (the first sensory result and the second sensory result) is made public or private.

Second device 2 of system management company 200 calculates the amount charged to client 100 based on the public setting information indicating whether it is public or private transmitted from first device 1 of client 100. As illustrated in FIG. 8, for example, a client A sets first information indicating 14 items of a total of 14 items of the analysis result are set public, and sets second information indicating 4 items of a total of 4 items of the examination result are set public. In this case, a discount rate applied to the amount charged to client A is 15%. A client B sets first information indicating 10 items of the total of 14 items of the analysis result are set public, and sets second information indicating 3 items of the total of 4 items of the examination result are set public. In this case, a discount rate applied to the amount charged to client B is 7%.

A client C sets first information indicating 8 items of the total of 14 items of the analysis result are set public, and sets second information indicating 2 items of the total of 4 items of the examination result are set public. In this case, a discount rate applied to the amount charged to client C is 5%. A client D sets first information indicating 5 items of the total of 14 items of the analysis result are set public, and sets second information indicating one item of the total of 4 items of the examination result is set public. In this case, a discount rate applied to the amount charged to client D is 3%. A client E sets first information indicating none of the total of 14 items of the analysis result is set public, and sets second information indicating none of the total of 4 items of the examination result is set public. In this case, a discount rate applied to the amount charged to client E is 0%.

As illustrated in FIG. 8, a setting is made such that the discount rate as the information regarding the amount charged varies in a manner that depends on the number of public analysis results and the number of public examination results. The higher the number of public results, the higher the discount rate applied to the amount charged. As described above, there is an advantage that a disclosing side can receive a large discount on the amount charged by increasing the number of public results.

Under the machine learning method of the present embodiment, it is possible to select whether each item of the analysis result and the examination result acquired by client 100 is made public or private. Second device 2 of system management company 200 gives the public or private tag, and performs the machine learning using the analysis result information and the examination result information to which the public tag has been given as the training data.

As described above, it is possible to increase the accuracy and efficiency by using the analysis result information and the examination result information to which the public tag has been given. Since the discount rate applied to the amount charged varies in a manner that depends on the number of pieces of analysis result information and examination result information to which the public tag has been given, it is possible to cause client 100 to actively make the result information public.

<Modification>

In the above-described embodiment, the discount rate applied to the amount charged may be set to vary in a manner that depends on the number of public results. Alternatively, the discount rate applied to the amount charged may be set to vary in a manner that depends on the content of the public item. Specifically, a discount rate applied to a client who makes items having less public data public may be set higher than discount rates applied to other clients.

In the above-described embodiment, processor 21 of second device 2 outputs the sensory prediction result from the input analysis result. Processor 21 may output the study result from the input analysis result and sensory evaluation result, or may output the study result from the input analysis result and sensory prediction result.

In the above-described embodiment, a description has been given of a case where the sensory test is performed by system management company 200. The sensory test may be performed by client 100 or entrusted analysis company 300 having the analysis instrument. For example, in a case where the sensory test is performed by client 100, the amount charged may be reduced by the amount for the sensory test.

In the above-described embodiment, third device 3 of entrusted analysis company 300 may directly transmit the analysis result to first device 1 of client 100 without transmitting the analysis result to second device 2 of system management company 200. This makes it possible to eliminate the need for second device 2 of system management company 200 to perform the processing of receiving and transmitting the analysis result.

In the above-described embodiment, a public range that can be referred to may be set for each client. For example, when client A and client B are related companies, the public range that can be referred to may be made large, and when client A and client C are competitors, the public range that can be referred to may be made small as compared with the relationship with client B.

In the above-described embodiment, instead of changing the amount charged in accordance with an information public status, an information search range may be set large when the number of public results is large, and the information search range may be set small when the number of public results is small.

In the above-described embodiment, even a company other than the client who has made a request may be able to search for information on the server by paying a fee.

In the above-described embodiment, the analysis information transmitted from first device 1 to second device 2 may include information such as the date of manufacture of a food sample and the type of the food sample.

[Aspect]

It is to be understood by those skilled in the art that the plurality of exemplary embodiments described above are specific examples of the following aspects.

(Clause 1) A machine learning method according to one aspect relates to a machine learning method that is performed by a computing device belonging to a system management company. The computing device performs acquiring an analysis result of analyzing a sample by an analysis instrument and a first sensory result of the sample, acquiring public setting information regarding whether the analysis result and the first sensory result are made public or private, storing the public setting information, and the analysis result and the first sensory result with the public setting information associated with the analysis result and the first sensory result, creating a learned model by performing machine learning for predicting the first sensory result using, as training data, at least either the analysis result or the first sensory result, the analysis result or the first sensory result being set public, and outputting a second sensory result by inputting the analysis result that is set private to the learned model created by performing the machine learning.

According to the machine learning method of clause 1, it is possible to provide a machine learning method that takes whether the sensory result is made public or private into consideration.

(Clause 2) The first sensory result is any one of a sensory evaluation result of the sample, a sensory prediction result output by the computing device based on the analysis result, or a study result associated with the analysis result and the sensory evaluation result or the analysis result and the sensory prediction result.

According to the machine learning method of clause 2, it is possible to provide a machine learning method that takes whether any one of the sensory evaluation result, the sensory prediction result, or the study result is made public or private into consideration.

(Clause 3) The sensory evaluation result is a result obtained by evaluating the sample by a sensory measurement evaluator.

According to the machine learning method of clause 3, it is possible to set the sensory evaluation result evaluated by the sensory measurement evaluator public or private.

(Clause 4) The computing device further performs carrying out an operation on the analysis result input and outputting the sensory prediction result.

According to the machine learning method of clause 4, since the sensory prediction result can be output from the analysis result, it is possible to increase the accuracy of the sensory prediction result.

(Clause 5) The computing device further performs carrying out an operation on the analysis result input, and the sensory evaluation result input or the sensory prediction result input and outputting the study result.

According to the machine learning method of clause 5, since the study result can be output from the analysis result, and the sensory evaluation result or the sensory prediction result, it is possible to increase the accuracy of the study result.

(Clause 6) The public setting information is stored with the public setting information associated with client information belonging to the system management company.

According to the machine learning method of clause 6, it is possible to appropriately manage information made public or private for each piece of client information.

(Clause 7) The computing device further performs changing information regarding an amount charged to a client in accordance with the public setting information associated with the client information.

According to the machine learning method of clause 7, it is possible to charge an appropriate amount in accordance with information made public or private by the client.

(Clause 8) The computing device further performs making a setting so as to make the analysis result, the first sensory result, and the second sensory result public on a server via a network, the analysis result, the first sensory result, and the second sensory result being set public in the public setting information, and to make the analysis result, the first sensory result, and the second sensory result private on the server, the analysis result, the first sensory result, and the second sensory result being set private in the public setting information.

According to the machine learning method of clause 8, it is possible to appropriately make only the analysis result, the first sensory result, and the second sensory result public on the server, the analysis result, the first sensory result, and the second sensory result public being set public.

(Clause 9) The public setting information includes first information regarding whether the analysis result is made public or private, and second information regarding whether the first sensory result and the second sensory result are made public or private.

According to the machine learning method of clause 9, it is possible to set the first information and the second information individually.

Although the present invention has been described and illustrated in detail, it is clearly understood that the same is by way of illustration and example only and is not to be taken by way of limitation. The scope of the present invention is interpreted by the terms of the appended claims, and the present invention is intended to include the claims, equivalents of the claims, and all modifications within the scope.

What is claimed is:

1. A machine learning method that is performed by a computing device belonging to a system management company, and a computing device of a client, the machine learning method causing the computing device belonging to the system management company to perform:

acquiring an analysis result of analyzing a sample by an analysis instrument and a first sensory result of the sample;

acquiring public setting information regarding whether the analysis result and the first sensory result are made public or private;

storing the public setting information, the analysis result, and the first sensory result, the public setting information being associated with the analysis result and the first sensory result;

creating a learned model by performing machine learning for predicting the first sensory result using, as training data, at least either the analysis result or the first sensory result, the analysis result or the first sensory result being set public; and outputting a second sensory result by inputting the analysis result that is set private to the learned model, and the machine learning method causing the computing device of the client to perform;

setting the public setting information to individually make each of the analysis result and the first sensory result public or private; and transmitting the public setting information to the computing device belonging to the system management company.

2. The machine learning method according to claim 1, wherein the first sensory result is any one of a sensory evaluation result of the sample, a sensory prediction result output by the computing device belonging to the system management company based on the analysis result, or a study result associated with the analysis result and the sensory evaluation result or the analysis result and the sensory prediction result.

3. The machine learning method according to claim 2, wherein the sensory evaluation result is a result obtained by evaluating the sample by a sensory measurement evaluator.

4. The machine learning method according to claim 2, further causing the computing device belonging to the system management company to perform carrying out an operation on the analysis result input and outputting the sensory prediction result.

5. The machine learning method according to claim 2, further causing the computing device belonging to the system management company to perform carrying out an operation on the analysis result, and the sensory evaluation result or the sensory prediction result and outputting the study result.

6. The machine learning method according to claim 1, wherein the public setting information is stored in association with client information belonging to the system management company.

7. The machine learning method according to claim 6, further causing the computing device belonging to the system management company to perform changing information regarding an amount charged to a client in accordance with the public setting information associated with the client information.

8. The machine learning method according to claim 1, further causing the computing device belonging to the system management company to perform making a setting so as to make the analysis result, the first sensory result, and the second sensory result public on a server via a network, the analysis result, the first sensory result, and the second sensory result being set public in the public setting information, and to make the analysis result, the first sensory result, and the second sensory result private on the server, the analysis result, the first sensory result, and the second sensory result being set private in the public setting information.

9. The machine learning method according to claim 1, wherein the public setting information includes first information regarding whether the analysis result is made public or private, and second information regarding whether the first sensory result and the second sensory result are made public or private.

10. The machine learning method according to claim 1, further causing the computing device belonging to the system management company to perform transmitting the analysis result and the first sensory result to the computing device of the client, and further causing the computing device of the client to receive the analysis result and the first sensory result from the computing device belonging to the system management company.

11. The machine learning method according to claim 1, wherein the acquired public setting information is received from a customer computer that individually sets the acquired public setting information for the analysis result as public or private.

12. The machine learning method according to claim 1, wherein the acquired analysis result includes data provided by multiple clients.

* * * * *